(12) United States Patent
Nordstrom et al.

(10) Patent No.: US 7,992,839 B2
(45) Date of Patent: Aug. 9, 2011

(54) ELECTROHYDRAULIC VALVE HAVING A SOLENOID ACTUATOR PLUNGER WITH AN ARMATURE AND A BUSHING

(75) Inventors: Robert Scott Nordstrom, Wauwatosa, WI (US); Kirt Nathaniel Stephens, New Berlin, WI (US); Edward Aloysius Flynn, Pewaukee, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 767 days.

(21) Appl. No.: 12/103,263

(22) Filed: Apr. 15, 2008

(65) Prior Publication Data

US 2009/0256092 A1 Oct. 15, 2009

(51) Int. Cl.
*F16K 31/02* (2006.01)
(52) U.S. Cl. .................................. 251/129.15; 335/279
(58) Field of Classification Search ............. 251/129.15; 335/279
See application file for complete search history.

(56) References Cited

U.S. PATENT DOCUMENTS

| | | | |
|---|---|---|---|
| 3,788,597 A | 1/1974 | Ichioka | |
| 4,127,835 A | 11/1978 | Knutson | |
| 4,267,897 A | 5/1981 | Takeshima | |
| 4,525,695 A | 6/1985 | Sheng et al. | |
| 5,004,440 A | 4/1991 | Suzuki | |
| 5,249,603 A | 10/1993 | Byers, Jr. | |
| 5,252,939 A | 10/1993 | Riefler et al. | |
| 5,368,070 A * | 11/1994 | Bosley | 137/614.04 |
| 6,029,704 A * | 2/2000 | Kuroda et al. | 137/625.65 |
| 6,313,726 B1 | 11/2001 | Golovatai-Schmidt et al. | |
| 6,435,472 B1 | 8/2002 | Najmolhoda et al. | |
| 6,612,544 B2 | 9/2003 | Sakata et al. | |
| 6,640,834 B1 | 11/2003 | Hamkins et al. | |
| 6,659,121 B1 | 12/2003 | Takahashi et al. | |
| 7,007,925 B2 | 3/2006 | Nordstrom et al. | |
| 7,243,899 B2 * | 7/2007 | Acar et al. | 251/129.07 |
| 7,513,482 B2 * | 4/2009 | Shibata et al. | 251/129.15 |

* cited by examiner

*Primary Examiner* — John Fristoe, Jr.
(74) *Attorney, Agent, or Firm* — Quarles & Brady LLP; George E. Haas

(57) ABSTRACT

A solenoid operated valve has a valve body with a plurality of ports and a spool slideable within the valve body to interconnect the ports in different combinations. An actuator includes a solenoid coil assembly and an armature slideably received in the solenoid coil assembly. A bushing has a cylindrical body from which a push member projects into engagement with the spool and from which a coupling shaft extends into an aperture in the armature. A passage is provided in the bushing to allow fluid to flow between opposites sides as the bushing slides in the solenoid coil assembly. The cylindrical body rides in the solenoid coil assembly and has a plurality of external grooves that enable fluid to pass around the body.

21 Claims, 2 Drawing Sheets

ELECTROHYDRAULIC VALVE HAVING A SOLENOID ACTUATOR PLUNGER WITH AN ARMATURE AND A BUSHING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrically operated spool valves that control flow of a fluid, and more particularly to electrical actuators, such as solenoids, for operating those valves.

2. Description of the Related Art

A wide variety of machines have moveable members that are operated by an hydraulic actuator. For example an internal combustion engine has a camshaft which is mechanically coupled to rotate with the crankshaft and which opens and closed cylinder intake and exhaust valves. Traditionally the camshaft timing was fixed at a setting that produced the best operation at all engine operating speeds. However, it has been recognized that engine performance can be improved if the valve timing varies section as a function of engine speed, engine load, and other factors. Thus a hydraulic actuator is being used on some engines to vary the coupling relationship of the camshaft to the crankshaft and a solenoid operated valve is employed to control the application of pressurized fluid to operate the hydraulic actuator.

U.S. Pat. No. 7,007,925 discloses one type of solenoid operated valve that has been used to vary the timing of an internal combustion engine. A unique feature of this valve is that the armature assembly of the solenoid has a ball bearing which reduces resistance to movement of the armature. The armature assembly included the metal armature from which a push pin projected to engage and move a flow control spool of the valve. The ball bearing comprised a cylindrical cage that held a plurality of balls inserted through openings in one end of the cage. The cage was slid over the push pin until the openings were against the armature to retain the balls and then the cage was secured to the push member by a push-on nut. When the solenoid is assembled the armature assembly moved within a bore and the balls rolled along the surface of the bore. Although the ball bearing worked very well, it added complexity to the valve assembly process.

Therefore, it is desirable to refine the design of this type of solenoid operated valve to facilitate manufacturing.

SUMMARY OF THE INVENTION

An electrohydraulic valve includes a body with a valve bore into which an first port and a second port communicate. A spool slides within the valve bore to connect and disconnect selectively the first and second ports in different positions of the spool.

The spool is moved within the valve bore by an electrically operated actuator, that includes a solenoid coil assembly having an actuator bore in which an armature and a bushing are slideably located. The bushing is attached to a first end of the armature and is in contact with the spool. In a preferred embodiment, the bushing comprises a cylindrical body from one side of which a push member projects into engagement with the spool and from another side of which a coupling shaft extends into an aperture in the armature.

A region at a second end of the armature is in contact with a surface of the actuator bore and a gap exists between the actuator bore and a portion of the armature extending from the region to a second end of the armature. The cylindrical body of the bushing contacts the surface of the actuator bore and maintains the gap at the first end of the armature. Preferably, a passage is provided for fluid to flow between opposite sides of the bushing.

DETAILED DESCRIPTION OF THE INVENTION

Figure 1:
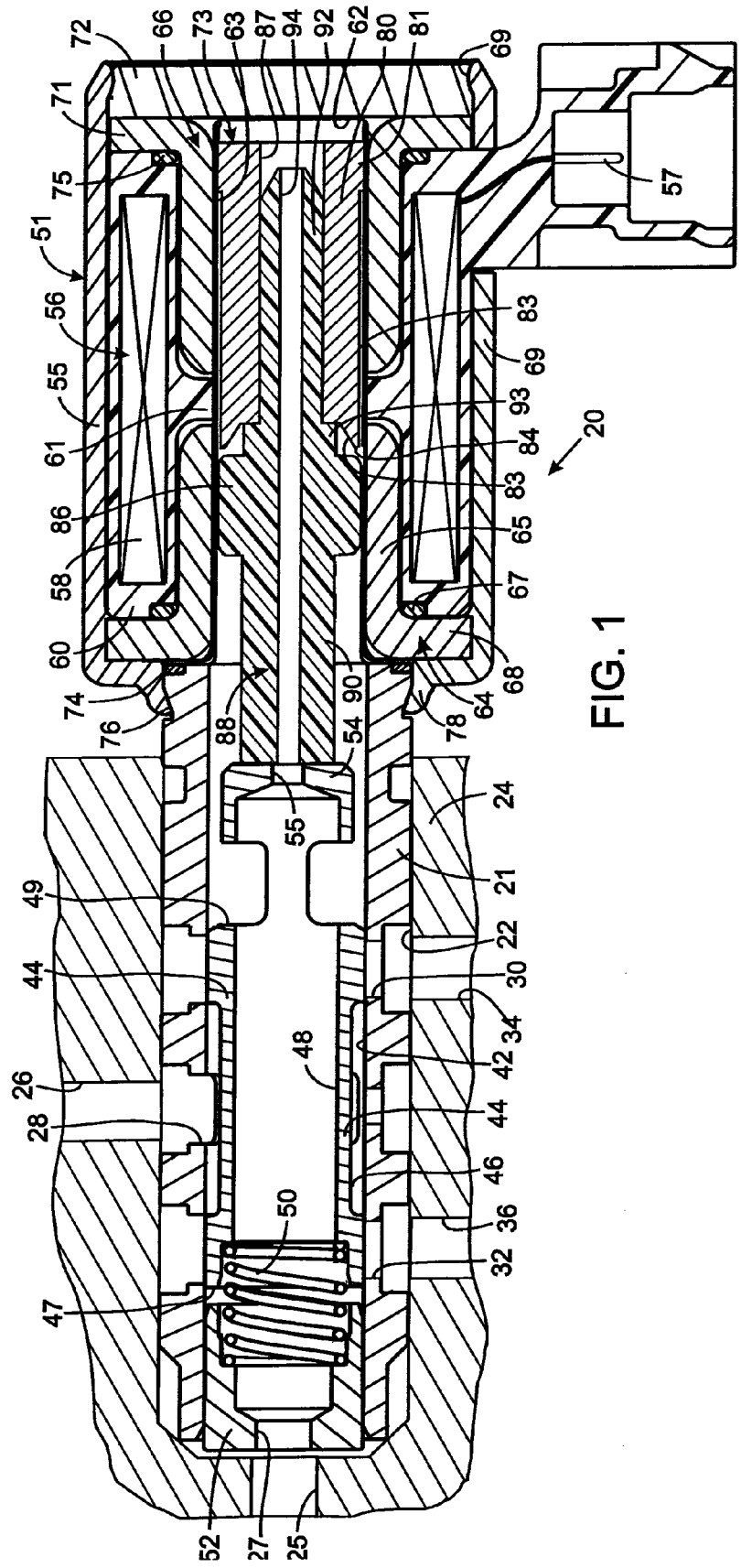
FIG. 1 is a longitudinal cross section view through an electrohydraulic valve according the present invention.

Referring to FIG. 1, an electrohydraulic control valve 20 has a tubular valve body 21 that during use is inserted into an aperture 22 in a manifold 24. The tubular valve body 21 has a longitudinal bore 42 into which a plurality of ports open. A supply passage 26 in the manifold 24 conveys pressurized fluid from a pump and a return passage 25 conveys fluid back to a tank of the hydraulic system in which the valve is incorporated. The supply passage 26 opens into an inlet port 28 of the control valve 20 and the return passage 25 at the end of the manifold aperture 22 communicates with an outlet port 27 of the valve. The inlet port 28 includes a first annular recesses 29 which is formed in an exterior curve surface 23 of the valve body 21. First and second workports 30 and 32 in the tubular valve body 21 communicate with passages 34 and 36 that lead to a hydraulic actuator being controlled. The first and second workports 30 and 32 include annular recesses 31 and 33 respectively which are formed in the exterior curve surface of the valve body 21.

A spool 44 is slideably received within the bore 42 of the valve body 21 and has an exterior annular notch 46 which, in selective positions of the spool, provides a fluid passage between the inlet port 28 and one of the two workports 30 and 32 and thus between the associated manifold passages. In a middle, or intermediate, position of the spool travel as depicted in FIG. 1, the inlet port 28 is closed from both workports 30 and 32. A central passage 48 extends between the opposite ends 47 and 49 of the spool 44. A head 54 is at the outward end 49 of the valve spool 44 and has an aperture 53 there through. A spring 50 biases the spool 44 away from a nose piece 52 at the end of the valve body 21 at which the outlet port 27 is located.

Referring again to FIG. 1, the valve 20 also includes an electromagnetic linear actuator 51 which comprises a metal outer housing 55 that surrounds a solenoid coil 58 in a non-magnetic bobbin 60, preferably made of plastic molded around the coil. As used herein, "non-magnetic" designates an object as being neither attracted to or repelled by a magnetic field. The solenoid coil 58 is driven by a pulse width modulated (PWM) electrical signal having a duty cycle that is varied in a conventional manner to produce a magnetic field that moves the spool 44 to different desired positions in the valve body 21. The PWM signal is applied to the linear actuator 51 via a connector 57 formed in a lateral projection of the bobbin 60 and connected by wires to the solenoid coil 58.

The linear actuator 51 further includes two magnetically conductive pole pieces 64 and 66. The first pole piece 64 has an interior, tubular section 65 that extends into one end of the bobbin 60. An O-ring 67 provides a hermetic seal between the first pole piece 64 and the bobbin 60. The first pole piece 64 has a first flange 68 which projects outwardly from the tubular section 65 across the outer end of the valve body 21. The second pole piece 66 has a second tubular section extending into the opposite end of the bobbin 60 and has an interior end that is spaced from the first pole piece 64. An inwardly projecting annular rib 61 of the bobbin magnetically separates the first and second pole pieces 64 and 66. The outer end of the second pole piece 66 has a second flange 71 projecting outwardly and another O-ring 75 provides a hermetic seal between this flange and the bobbin 60. The solenoid coil 58, the bobbin 60, and the first and second pole pieces 64 and 66 form a solenoid coil assembly 56.

The solenoid coil assembly 56 also comprises a liner tube 62, preferably of a non-magnetic material such as stainless steel, inserted through the inner housing end into the first and second pole pieces 64 and 66. The liner tube 62 provides a magnetic barrier between the pole pieces, as well as acting as a guide for a sliding actuator plunger 70. An open end of the liner tube 62 faces the valve body 21 and a closed end is adjacent the outwardly projecting flange 71 of the second pole piece 66.

A disk 72 is inserted into the outer open end 69 of the outer housing 55, which is crimped against the disk 72 to close that opening. The inwardly projecting flange 74 at the opposite end of the outer housing 55 is crimped into an annular groove 76 in the exterior surface of the valve body 21, thereby securing those components together. An O-ring 78 provides a fluid tight seal between a flange on the liner tube 62 and the valve body 21. Thus the closed liner tube 62 creates an actuator bore 63 within the linear actuator 51 that contains the fluid passing through the valve body 21.

Figure 2:
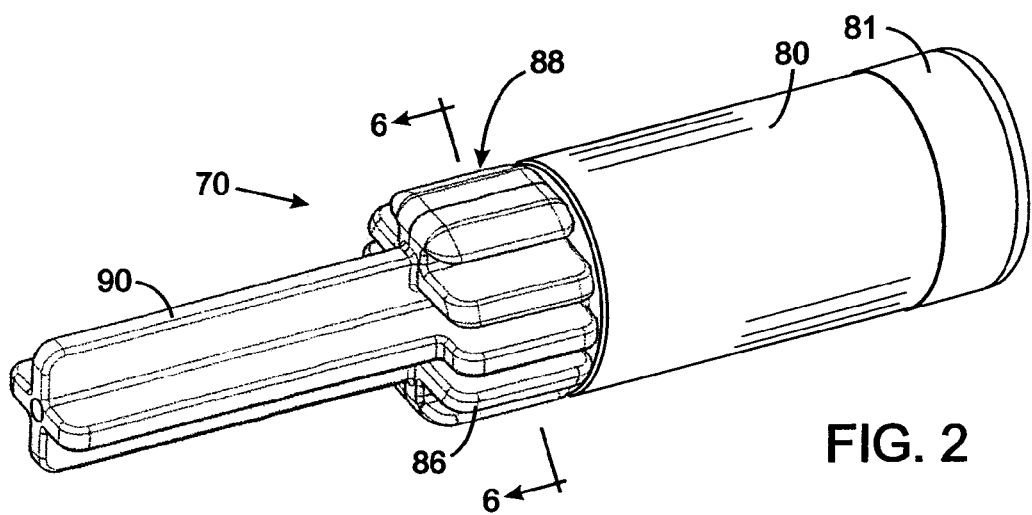
FIG. 2 is an isometric view of an actuator plunger in the valve.

Referring to FIGS. 1 and 2, the actuator plunger 70 of the linear actuator 51 is slideably located within the aperture of the liner tube 62 and includes an armature 80 of ferromagnetic material. A region 81 at the outer end portion of the armature 80 has a slightly larger diameter than the remainder of the armature so that only a relatively small surface area contacts the actuator bore 63 formed by the inside curved surface of the liner tube 62. Therefore, a gap 82 exists between most of the armature and the liner tube surface. By reducing this area of contact, resistance to the armature 80 sliding in the actuator bore 63 is minimized. However, creating that gap 82 increases the magnetic impedance which tends to diminish the magnetic force acting on the armature. In response, the inner end of the armature 80 has a tapered recess 83, which forms a knife edge 84 around the outer perimeter of that end. The magnetic flux flowing between the armature and the first pole piece 64 is concentrated through the knife edge 84, thereby counteracting the adverse effect of the gap 82 on the electromagnetic performance of the actuator 51.

The actuator plunger 70 further includes a bushing 88 that interfaces the armature 80 to the spool 44 and maintains the gap 83 between the armature and the liner tube 62. Thus, the only part of the armature 80 that contacts actuator bore 63 in the liner tube 62 is the region 81 at the outer end. An axial force is applied to the actuator plunger 70 by the magnetic flux at the end of the first pole piece 64 and the bushing 88 at this location prevents binding of the armature in the actuator bore 63 due to this axial force. The bushing 88 has a cylindrical body 86 with a push member 90 projecting from one side and a coupling shaft 92 projecting from the other side. The bushing is fabricated of a non-magnetic material, preferably a polymer, such as Ultem® 2300 glass reinforced polyetherimide (Ultem is a registered trademark of the General Electric Company).

Both the push member 90 and the coupling shaft 92 have cross sections in the shape of a cross, particularly one resembling a plus sign. The push member 90 abuts the head 54 of the valve spool 44 and the coupling shaft 92 is pressed into an aperture 87 through the armature 80. Annular flanges 93 extend outward from the cylindrical body 86 and a portion of the coupling shaft 92. The flanges 93 are received in the tapered recess 83 of the armature 80 and space the cylindrical body 86 from the armature's knife edge 84. A passage 94 extends completely through the bushing 88 between ends of the push member 90 and the coupling shaft 92 that are remote from the cylindrical body 86, thereby enabling fluid to flow through the actuator plunger 70.

Figure 3:
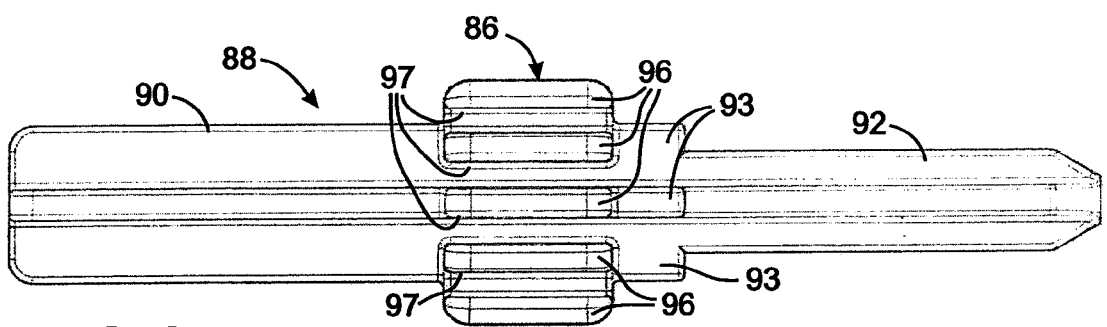
FIG. 3 is a side view of a bushing that is part of the actuator plunger.
Figure 4:
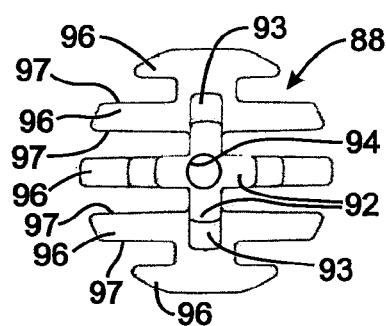
FIG. 4 is an end view of the bushing.

As shown particularly in FIGS. 3 and 4, the cylindrical body 86 is formed by a plurality of fins 96 which define grooves 97 between the ends of the body. The grooves allow fluid to flow between opposite sides of the cylindrical body 86 upon movement of the actuator plunger 70 within the liner tube 62 due to the magnetic field produced by the solenoid coil 58. Enabling this free flow of fluid through the actuator plunger 70 and around the cylindrical body 86 minimizes resistance to motion of the actuator plunger that otherwise could the result if those flows were more restricted.

The outer curved surface of the cylindrical body 86 contacts the interior surface of the liner tube 62. The grooves 97 in cylindrical body 86 result in only the longitudinal edges of the fins 96 contacting the liner tube 62, thereby reducing the area of that contact and the friction there between. The feature further reduces resistance to the motion of the actuator plunger 70.

When the electrohydraulic valve 20 in FIG. 1 is not activated by electric current applied to the solenoid coil 58, the spring 50 forces the spool 44 into a position at which the annular notch 46 provides a fluid passage between the inlet port 28 and the first workport 30 leading to the first manifold passage 34. In this de-energized state, the inner end 47 of the spool 44 is positioned to the right which opens a path between the outlet port 27 and the second workport 32 communicating with the second manifold passage 36. Pressurized fluid now is fed through the supply passage 26 to first workport 30 and oil is drained from second workport 32 to the return passage 25.

From the de-energized state, application of a relatively small magnitude electric current to the solenoid coil 58 produces movement of the armature 80 and push member 90 toward the nose piece 52. This motion also moves the spool 44 to the left in FIG. 1, thereby reducing the size of the fluid paths described immediately above. This decreases the flow of fluid between the various valve ports.

Application of a greater magnitude electric current to the solenoid coil 58 eventually moves the spool 44 farther leftward into an intermediate position depicted in FIG. 2, closing the previous paths between the inlet port 28 and the first workport 30 and between the outlet port 27 and the second workport 32. This terminates all fluid flow through the control valve 20.

Alternatively, the annular spool notch 46 in the valve body 21 can be configured so that in this intermediate position the first and second workports 30 and 32 both communicate with the inlet port 28. This applies equal pressure to both the first workport 30 and the second workport 32.

Referring still to FIG. 1, applying a still greater magnitude electric current to the solenoid coil 58 causes the spool 44 to move farther to the left into a position where the first workport 30 communicates with the central passage 48 through the spool 44. This opens a fluid path between the first workport 30 and the outlet port 27. In this position, the annular notch 46 around the spool 44 provides a passage between the inlet port 28 and only the second workport 32. This applies pressurized fluid from supply passage 26 to the second workport 32 and drains the fluid from the first workport 30 to the return passage 25. The size of the openings between these passages is varied by controlling magnitude of the electric current applied to the solenoid coil 58 to meter the flow of fluid and thus control the rate at which valve timing changes.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An electrohydraulic valve comprising:
   a valve body having a two fluid ports;
   a spool moveably received within the valve body to selectively connect and disconnect the two fluid ports in different positions of the spool; and
   an actuator comprising a solenoid coil assembly, and an armature that is slideably received in a bore of the solenoid coil assembly and that has a first region at a first end in contact with a surface of the bore and a second region between the first region and a second end which is spaced from the bore, the actuator further includes a bushing attached at the second end of the armature and in contact with the spool and a surface of the bore proximate to the second end of the armature.

2. The electrohydraulic valve as recited in claim 1 wherein the bushing comprises a cylindrical body in contact with a surface of the bore and from which a push member projects into engagement with the spool, and a coupling shaft extending from the cylindrical body into an aperture in the armature.

3. The electrohydraulic valve as recited in claim 2 wherein the cylindrical body of the bushing has at least one groove therein to allow fluid to flow between opposite sides of the cylindrical body.

4. The electrohydraulic valve as recited in claim 2 wherein the armature has a recess in one end; and the bushing has a flange which projects outward from the cylindrical body and from the coupling shaft, wherein the flange extends into the recess.

5. The electrohydraulic valve as recited in claim 1 wherein the actuator further comprises a liner tube within the solenoid coil assembly and within which the armature and the bushing slide, the bushing has an exterior surface that is in contact with an interior surface of the liner tube.

6. The electrohydraulic valve as recited in claim 1 wherein the bushing is formed of non-magnetic material.

7. The electrohydraulic valve as recited in claim 1 wherein the bushing is formed of a polymer.

8. The electrohydraulic valve as recited in claim 1 wherein the bushing is a single-piece.

9. The electrohydraulic valve as recited in claim 1 wherein the bushing has a fluid passage there through.

10. The electrohydraulic valve as recited in claim 1 wherein the bushing is in continuous contact with the surface of the bore as the armature is slides within the bore.

11. An electrohydraulic valve comprising:
    a valve body with a valve bore and having a two fluid ports in communication with the bore;
    a spool slideably received within the valve bore and a fluid passage therein which selectively connects and disconnects the two fluid ports in different positions of the spool in the valve bore; and
    an actuator having a solenoid coil assembly with an actuator bore within which an armature is slideably received, the armature has an aperture there through, the actuator further comprises a bushing having a cylindrical body in contact with a surface of the bore, and from which a push member projects into engagement with the spool and from which a coupling shaft extends into the aperture in the armature.

12. The electrohydraulic valve as recited in claim 11 wherein the bushing is fabricated of non-magnetic material.

13. The electrohydraulic valve as recited in claim 11 wherein the bushing is formed of a polymer.

14. The electrohydraulic valve as recited in claim 11 wherein the bushing is a single-piece.

15. The electrohydraulic valve as recited in claim 11 wherein the cylindrical body of the bushing has at least one groove therein to allow fluid to flow between opposite sides of the cylindrical body.

16. The electrohydraulic valve as recited in claim 11 wherein the bushing has a passage extends through the push member, cylindrical body and the coupling shaft.

17. The electrohydraulic valve as recited in claim 11 wherein the armature has a recess in one end; and the bushing has a flange which projects outward from the cylindrical body and from a portion of the coupling shaft, wherein the flange extends into the recess.

18. The electrohydraulic valve as recited in claim 11 wherein the actuator further comprises a liner tube forming the actuator bore and within which the armature and the bushing slide, the cylindrical body of the bushing contacts the liner tube.

19. The electrohydraulic valve as recited in claim 18 wherein the armature has a region at a first end in contact with the liner tube, wherein a gap exists between the liner tube and a portion of the armature between the region and a second end of the armature.

20. The electrohydraulic valve as recited in claim 11 wherein the armature has a region at a first end in contact with a surface of the armature bore, wherein a gap exists between the armature bore and a portion of the armature between the region and a second end of the armature.

21. The electrohydraulic valve as recited in claim 11 wherein each of the push member and the coupling shaft has a cross section with a shape of a cross.

* * * * *